May 8, 1956  L. E. NORTON  2,745,014
GAS RESONANCE SYSTEM
Filed Aug. 3, 1953  2 Sheets-Sheet 1
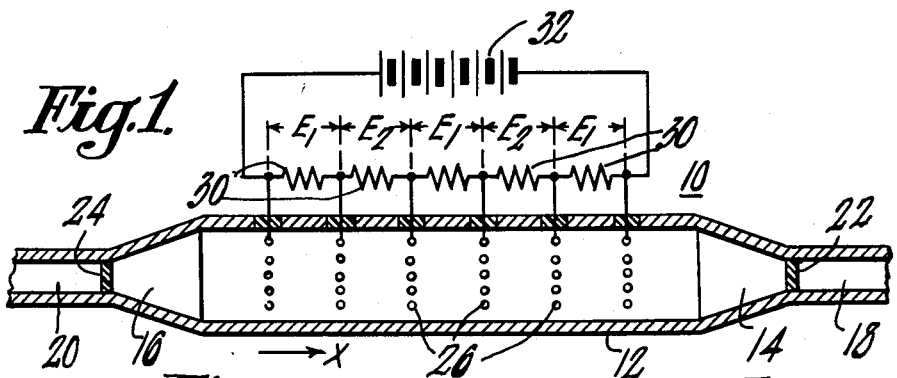
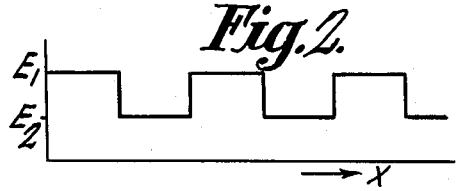
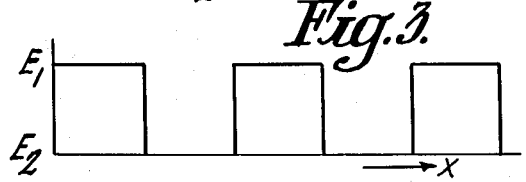
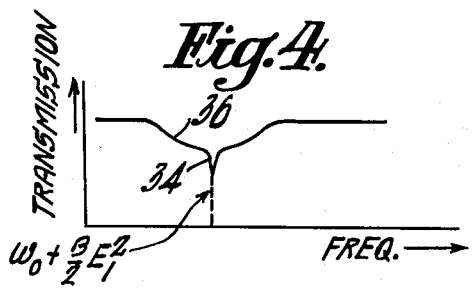
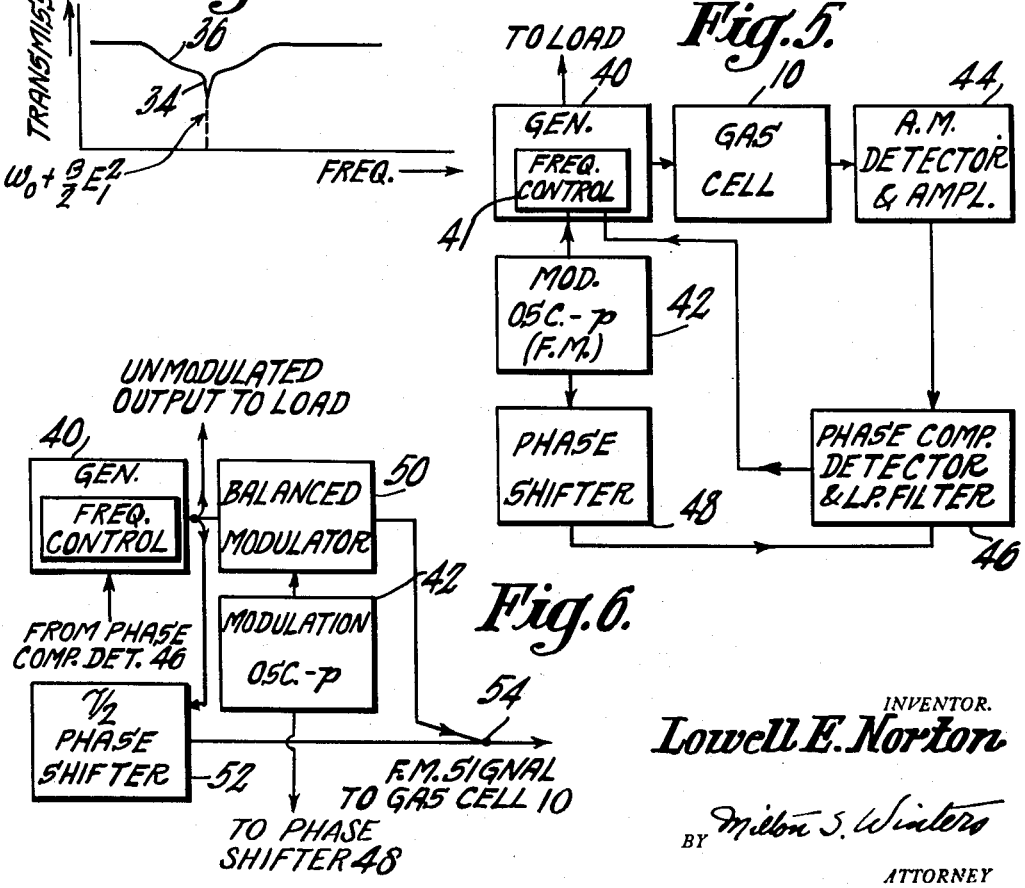
INVENTOR.
Lowell E. Norton
BY Milton S. Winters
ATTORNEY

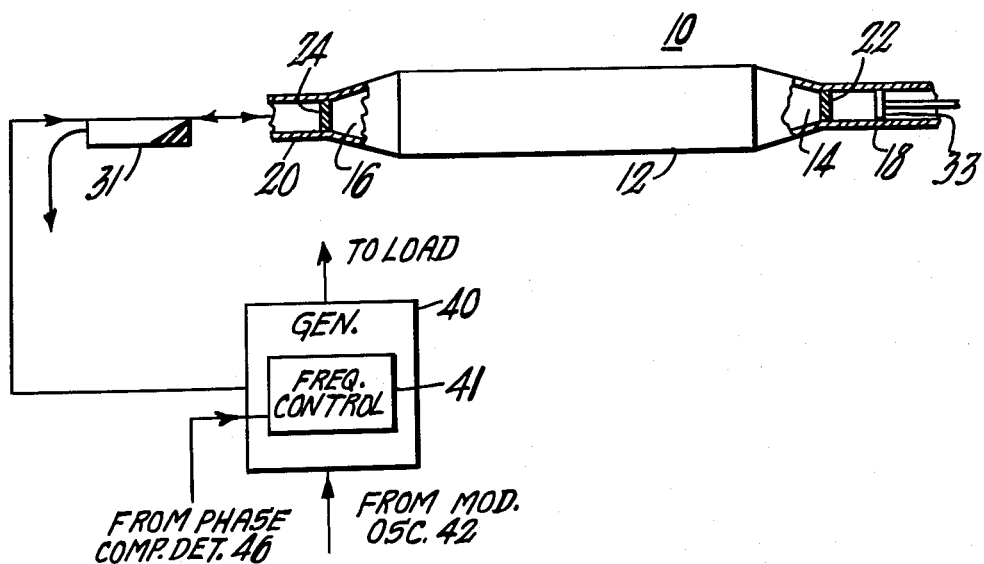

United States Patent Office 2,745,014
Patented May 8, 1956

2,745,014

GAS RESONANCE SYSTEM

Lowell E. Norton, Princeton, N. J., assignor, by mesne assignments, to the United States of America as represented by the Secretary of the Army Application August 3, 1953, Serial No. 372,112

10 Claims. (Cl. 250—36)

The present invention is directed to the detection of resonances, and particularly to the detection of gas resonances.

It is known that various gases are resonant to microwave energy. The detection of the microwave resonances is a useful effect which may be employed for frequency control, gas analysis, and other purposes. The microwave resonance of gases may be detected by gas absorption. The energy is applied to the gas, and in the neighborhood of a resonance frequency the gas is absorbed to a greater degree than at the neighboring frequencies. Near this resonance frequency, the gas exhibits anomalous dispersion characteristics. In order to increase the apparent or equivalent Q of the gas resonance, the microwave energy may be applied to the gas in a low pressure container. Either the amplitude variations resulting from the absorption, or the phase shift resulting from the absorption may be employed for frequency control purposes, or for gas analysis or spectroscopy.

Higher values of Q are always desirable, because these provide a higher resolution in gas spectroscopy, and a higher degree of frequency stability in frequency control systems. There are several known factors which influence the frequency width of a molecular resonance absorption line or frequency spectral line. The more important of these factors, described in a qualitative way, are: (1) the natural width of the line; (2) saturation broadening as the result of high microwave power applied to the gas; (3) collision broadening, as the result of interruption of the absorption or emission process of a molecule because of a collision with another molecule of gas or with other obstacles; and (4) Doppler broadening, the result of the random motion of molecules toward and away from the source of the energy.

Reduction of the pressure, thereby increasing the mean free path of the molecules, avoids the effects of collision broadening. Also, at sufficiently low power levels, saturation broadening is avoided. At microwave frequencies the natural width is substantially negligible. However, the Doppler broadening of the line remains.

In one Doppler breadth reduction scheme, a gas cell is employed having means providing a spatially periodic field, so that a gas at low pressure in a cell and subjected to said field has its resonance frequency perturbed in a spatially periodic manner. The periodicity of the field is one-half wavelength at the frequency of the incident microwave energy. As will be shown more fully hereinafter, molecules of all thermal velocity classes contribute to a "coherent" absorption over a very narrow frequency interval, while they also contribute to an "incoherent" absorption over the usual broader frequency interval. Hence a spectral line of greatly enhanced Q is superimposed upon the ordinary relatively broader absorption line. At this certain frequency, the superimposed absorption spectral line may be detected by suitable means to take advantage of the exaggerated phase shift associated with anomalous dispersion.

One object of the present invention is to improve detection of a gas spectral line reduced in breadth by means of the gas cell just described.

Another object of the invention is to employ molecular resonances as a frequency standard or control in a manner affording a more stable standard and better control than heretofore available.

A further object of the invention is to provide an improved detection and therefore a higher effective circuit Q of a molecular resonance absorption spectral line by improving the detection thereof.

Another object of the invention is to improve the resolution obtainable in microwave spectroscopy.

According to the invention, the desired detection is accomplished by using for the energy incident upon the gas cell, a frequency modulated (F. M.) signal the carrier frequency of which corresponds to the average frequency (as mentioned above) between the two resonant frequencies in the spatially periodic field. The FM sidebands are at frequencies well outside of the width of the spectral line under consideration. Then the spectral line may be detected, by amplitude modulation detection, against the sidebands which pass through the cell without phase shift. Any phase shift of the signal at carrier frequency is readily detected by this method. The spectral line so detected may be utilized, by reason of the phase shift detection, as a feedback to control the microwave generator frequency, or for purposes of gas analysis.

The foregoing and other objects, advantages, and novel features of the invention will be more fully apparent from the following description when taken in connection with the accompanying drawing, in which like reference numerals refer to similar parts, and in which:

Figure 1 is a diagram schematically illustrating a gas cell and the voltages applied to the grids therein, suitable for use in the invention;

Figure 2 is a graph of certain voltages applied to the grids of the cell of Figure 1;

Figure 3 is a graph illustrating certain specified voltage conditions shown more generally in Figure 2;

Figure 4 is a plot of the transmission characteristics of the cell of Figure 1 plotted against frequency;

Figure 5 is a diagram schematically portraying, in block form, one embodiment of the invention;

Figure 6 is a diagram schematically portraying in block form a modification of the embodiment of Figure 5; and Figure 7 is a diagram schematically portraying a second modification of the arrangement of Figure 5.

Referring to Figure 1, a gas cell 10 is formed of a metallic chamber in the form of a waveguide 12 having ends tapered at 14 and 16 respectively to merge gradually into waveguides 18 and 20 respectively, which may be rectangular hollow pipe waveguides. A chamber 12 is sealed off at the entry of the waveguides 18 and 20 by dielectric seals 22 and 24 respectively. The chamber 12 contains a suitable gas, such as ammonia, resonant at microwave frequencies to electromagnetic wave energy. A plurality of grids 26 are spaced apart at a distance S from each other. Each grid 26 is formed of several wires lying preferably along lines normal to the view of the drawing, parallel to each other, and the line of each wire being normal to the direction of polarization of the incident microwave energy, at frequency $\omega_i$. A plurality of resistors 30 are connected in series, and a direct current (D. C.) voltage source 32 is connected across the series connected resistors 30. Every other one of the resistors 30 has one value of resistance, all equal to each other; and the remaining ones each have a second value of resistance, all equal to each other. Accordingly, a voltage of value $E_1$ is impressed between the first and second (from the left as viewed in Figure 1) grids 26, a different voltage $E_2$ exists between the second and third grids, a voltage $E_1$ again exists between the third and fourth grids, etc. The resulting spatially periodic field is illustrated by the graph in Figure 2.

It is known that if the gas in the gas cell is of the type for which the Stark shift is quadratic, the electric field existing between any two of the grids causes a shift in the frequency which may be expressed as $$\omega = \omega_0 + \beta E^2 \qquad (1)$$

where $\omega_0$ is the unperturbed resonant frequency, $\beta$ is an appropriate constant (always positive), and $E$ is the perturbing field. Thus under the conditions described and illustrated in connection with Figures 1 and 2, the perturbed spectral line frequency due to the voltages $E_1$ and $E_2$ between the successive grids 26 is successively:

$$\omega_1 = \omega_0 + \beta E_1^2$$
$$\omega_2 = \omega_0 + \beta E_2^2$$
$$\omega_3 = \omega_0 + \beta E_1^2$$
$$- - - - -$$
$$- - - - -$$
etc.

If, now, certain of the grids, such as every other pair, are short-circuited together (the resistances made zero), the successive fields are as shown in Figure 3, and $E_2$ is zero. In the general case, the mean or average perturbed frequency is:

$$\omega_i' = \omega_o + \frac{\beta}{2}(E_1^2 + E_2^2) \qquad (2)$$

and in the special case illustrated in Figure 3, this reduces to:

$$\omega_i = \omega_o + \frac{\beta}{2} E_1^2 \qquad (3)$$

Although a similar arrangement is readily shown to be operable for the more general situation, solely for purposes of illustration it may be assumed that the successive fields are as illustrated in Figure 3. The grid spacing, $S$, is selected so that in terms of the wavelength $\lambda$ of the exciting microwave field in the gas cell 10, $$S = \pi/2 \qquad (4)$$

It may be now shown that if the incident microwave energy from, for example waveguide 18 through the gas cell and passing to waveguide 20, has a frequency:

$$\omega_1 = \omega_0 + \beta E_1^2{}_2 \qquad (5)$$

which is the average of the perturbed resonant frequency in the spatially periodic gas cell 10, then a Doppler reduced bandwidth spectral line is found at this frequency. This spectral line may be detected by using the carrier frequency $\omega_i$ and sideband frequencies of FM (frequency modulation) relation, removed substantially from the spectral line as sidebands; and then detecting the transmitted energy for amplitude modulation, as will be explained more fully hereinafter.

The operating conditions which may be assumed are that the gas pressure of the gas in gas cell 10 is reduced so that all molecules, in traversing the grid structure in the cell, have a negligibly small number of collisions with other molecules; that the grid structures are substantially transparent to the microwave energy; and that the cell dimensions are so great that molecular collisions with the grids or cell walls contribute negligibly to the total spectral line band width. For such operating conditions, a molecule of any velocity class $v$, in traversing the grids of the cell, has two different resonant frequencies, alternately and in periodic fashion. (See Figure 1 or 3.) The incident, or driving, microwave carrier frequency stays constant at $\omega_i$ and coincides with neither. The fields to which the molecule is periodically subjected cause the molecular resonance frequencies of this molecule successively to be $\omega_A, \omega_B, \omega_A, \omega_B, \ldots$. Associated with $\omega_A$, the molecular absorption has a phase shift $\phi_A$, and with $\omega_b$ it has $\phi_b$. These phase shifts may be considered the result of the anomalous dispersion characteristic, where $\phi_a$ and $\phi_b$ are referred to a reference phase which could be zero for convenience if $\omega_i$ coincided with the unperturbed resonant frequency of the moving molecule.

Therefore, in traversing the grid structure of the cell, the absorption of a molecule of any velocity class $v$ in the $x$ direction undergoes a periodic phase shift which may be considered a phase modulation. The time derivative of this periodic phase modulation is a corresponding frequency modulation.

Now the molecule moving with velocity $v$ through the grid structure is exposed to a microwave frequency $\omega_1$. With respect to the molecule, however, there is a Doppler shift, so that the frequency of the incident energy referred to the moving molecule is:

$$\omega = \omega_1 (1 - v/c) \qquad (6)$$

if the molecule moves in the direction of the exciting microwave field where $c$ is the phase velocity of the energy.

Equations 5 and 6 are now combined to take into account the frequency perturbation due to the Stark field. Accordingly, for the system to be operative, the excitation frequency "seen" by the molecule must be:

$$\omega = \left(\omega_0 + \frac{\beta}{2} E_1^2\right)(1 - v/c) \qquad (7)$$

Due to the phase modulation mentioned above, the resonant absorptions occur not only at the frequency $\omega$, but at discrete frequencies displaced from $\omega$ by $$nv/c\left(\omega_0 + \frac{\beta}{2} E_1^2\right)(1 - v/c) \qquad (8)$$

Where $n$ is any integer. Consequently, the resonant absorptions occur at discrete frequencies which may be expressed as:

$$\omega' = \left(\omega_0 + \frac{\beta}{2} E_1^2\right)(1 - v/c + nv/c) \qquad (9)$$

where $n$ may be any integer including 0. It is now apparent that all of the absorption frequencies, or resonant absorption frequencies, except that one for which $n$ is $+1$, depends on the velocity class, $v$ of molecules under consideration. Therefore, it is only this first order upper side frequency or sideband, for which $n$ is $+1$, for which an in-phase absorption condition exists for all velocity classes of molecules. In other words, it is only for $n$ having the value $+1$ that the absorption frequency $\omega'$ is independent of the velocity class $v$. There is one other frequency, also $\omega'$, for which this condition exists, and it has been thus far neglected. This other frequency $\omega'$ is associated with molecules moving in a $-x$ direction, that is, opposite to the direction of propagation of the exciting microwave field, and yields an equation for $\omega'$ as follows:

$$\omega' = \left(\omega_o + \frac{\beta}{2} E_1^2\right)(1 + v/c + nv/c) \qquad (10)$$

For this second class of molecules, the velocity independent class occurs for $n = -1$. For the sake of simplicity and ease of explanation, only the frequency indicated to be velocity independent by Equation 9, and for which $n$ is $+1$, is considered. The corresponding approach and analysis for the other velocity-independent frequency will be apparent to those skilled in the art from what is said in connection with the first class.

The incident exciting microwave field may be written as:

$$e = E \cos\left[\left(\omega_o + \frac{\beta}{2} E_1^2\right) t\right] \qquad (11)$$

Then a molecule of velocity class $v$ travelling in the direction of propagation of this field will "see" the following field:

$$e_1 = E \cos\left[\left(\omega_o + \frac{\beta}{2} E_1^2\right)(1 - v/c) t\right] \qquad (12)$$

As shown above, the only component of the square wave phase modulation introduced by the periodic Stark fields of interest, that is, which is independent of the velocity class of the molecules, is the fundamental. Resonant absorption by the molecules may be considered as a source substracted from the incident energy. Accordingly, the resonant absorption field to be subtracted may be considered as having the following form:

$$e_1' = E' \cos\left[\left(\omega_o + \frac{\beta}{2}E_1^2\right)(1-v/c)t + \phi \sin v/c\left(\omega_o + \frac{\beta}{2}E_1^2\right)t\right] \quad (13)$$

where $\phi$ represents the magnitude of the fundamental component of the phase modulation of the molecular absorption due to molecular transit through the periodic Stark fields. The rate of sinusoidal variation of $\phi$ depends upon the velocity of the particular molecule under consideration in the $x$ direction and the spacing of the grids. Clearly, the period required for one cycle of phase modulation is:

$$T = \frac{\lambda}{v} \quad (14)$$

where $\lambda$ is the wavelength of the microwave energy, since $\lambda/2$ is the spacing of the grids. However, the wavelength $\lambda$ is equal to the phase velocity $c$ divided by the frequency, and hence we arrive at the expression for $e_1'$ of Equation 13.

As already explained, only the first order side frequencies are of interest, and only these are independent of $v$. Accordingly, retaining only this first side frequency we find for $e_1'$ the following expression:

$$e_1' = -J_1(\phi)E' \cos\left[\left(\omega_o + \frac{\beta}{2}E_1^2\right)t\right] \quad (15)$$

where $J_1(\phi)$ is a Bessel function of the first order of $\phi$. It is apparent that the other higher order side frequencies derived from Equation 13 do not provide coherent absorption, and do not contribute to a narrow Doppler reduced bandwidth absorption spectral line due to energy applied to the gas cell 10. Again, the molecules moving in the negative $x$ direction have been ignored, but again and in similar fashion a useful output term results, this time provided by the first order lower side frequency.

The transmission characteristics of the gas cell 10 may now be indicated in an idealized curve, qualitative in nature, as illustrated in Figure 4. In effect, there is absorption corresponding to the normal Doppler broadened line. Superimposed on this broadened line is the very narrow band absorption line 34 contributed by the expression just derived as Equation 15 and illustrated in Figure 4. The expression for the frequency of the spectral line 34 is independent of the velocity class of molecules $v$. This independence, it will be appreciated, is due to the fact that the first order sidebands of Equation 13, in its expansion, are independent of $v$, the velocity of any particular molecule. In other words, the absorption is coherent in phase at this particular side frequency, and is independent of the velocity of the molecules. Due to this velocity independence, it is not necessary to be concerned about the reference of the frequency to a relatively fixed object. This may be stated in a different way, by saying that only the first order upper and lower side frequencies (considering molecules moving both opposite to, and with, the direction of propagation of the microwave excitation) add coherently independent of molecular velocity. The frequencies of all the other discrete absorptions are functions of molecular velocity, and add incoherently.

A physically realizable absorption cell is preferably not very large. Therefore, the ratio of absorbed to incident field is small. The information available is measured by the ratio of the absorbed to the incident field, and not by the incident field. The situation conforms to the transmission of information by a large-carrier small-sideband system. It is well known that a receiver or detector operating under these conditions generally has a high noise and therefore should employ a narrow passband. This is especially true in the present situation, since only a narrow frequency band contains the desired precise frequency information.

Referring to Figure 5, the microwave generator 40 may supply energy to the gas cell 10 as by way of waveguide 20 of Figure 1. The generator 40 of Figure 5 may be a klystron or magnetron, or other microwave generator having a voltage responsive frequency control element. A modulation oscillator 42 is connected to the frequency control element 41 to frequency modulate the oscillations of the generator 40. The output of the gas cell 10 is applied to an AM (amplitude modulation) detector and amplifier 44. The AM detector and amplifier 44 is connected to a phase comparison detector and low pass filter 46. The phase comparison detector and low pass filter 46 is also connected to receive energy from the modulation oscillator 42 at the modulation frequency after passage through an adjustable phase shifter 48. The output of the phase comparison detector and low pass filter 46 is applied to the frequency control element 41.

In operation, the carrier frequency of the microwave generator 40 is selected to be $\omega_i$ as expressed for example in Equation 5. The output of the frequency modulated microwave generator 40 may therefore be expressed as:

$$e_o = E_o \cos\left[\left(\omega_o + \frac{\beta}{2}E_1^2\right)t - \frac{\Delta\omega}{p}\sin pt\right] \quad (16)$$

The ratio of deviation $\Delta\omega$ to the deviation frequency $p$ is selected relatively small, that is less than about 0.2. For this condition, the amplitudes of all the side frequency terms except the first are insignificant compared to those of the carrier and first side frequencies. Therefore, Equation 16 may be expanded as follows:

$$e_o = E_o J_0\left(\frac{\Delta\omega}{p}\right)\cos\left[\left(\omega_o + \frac{\beta}{2}E_1^2\right)t\right]$$
$$+ J_1\left(\frac{\Delta\omega}{p}\right)\cos\left[\left(\omega_o + \frac{\beta}{2}E_1^2 - p\right)t\right] \quad (17)$$
$$- J_1\left(\frac{\omega\Delta}{p}\right)\cos\left[\left(\omega_o + \frac{\beta}{2}E_1^2 + p\right)t\right]$$

The modulation frequency $p$ (angular frequency) is chosen sufficiently large so that the frequencies $$\left(\omega_o + \frac{\beta}{2}E_1^2 + p\right)$$

and $$\left(\omega_o + \frac{\beta}{2}E_1^2 - p\right)$$

fall well outside the frequency interval of anomalous dispersion while $$\left(\omega_o + \frac{\beta}{2}E_1^2\right)$$

is chosen to fall within the frequency interval defined by the spectral line.

Some residual mismatch in the mocrowave system must be expected. The customary effect is to introduce differential amplitude changes in the three frequencies of interest (carrier and two side frequencies). These differential amplitudes arise because of the difference in the standing wave at each of the three frequencies. These differential amplitudes may create a source of error which, however, can be greatly reduced or eliminated, by proper choice of the over-all microwave line length. Preferably, the over-all line length is selected so that the path length at the upper side frequency is $n\pi$ longer than at the carrier frequency, and at the same time so that the path length at the lower side frequency is $n\pi$ shorter than at the carrier frequency. The integer $n$ can, of course, be selected as unity. Then, the detector is at similar points on standing waves for each of the three frequency components. These standing waves are due to the mismatch mentioned above, but by making the standing waves similar for all three frequencies, the effects are compensated in detection.

The amplitude modulation detector 44 following the cell may be a simple crystal diode inserted in known manner in the wave-guide 20 of Figure 1. Four frequencies of interest are present at the detector 44. These are the three frequencies of Equation 17, above, and a fourth term which, although of the same frequency as the carrier frequency, is highly phase sensitive to frequency shifts. The frequency modulation carrier frequency term of Equation 17 has some phase sensitivity to frequency. However, this dependency is comparatively insensitive. Referring to Figure 4, the relatively insensitive term varies in phase with frequency at a slow rate corresponding to the broad portion 36 of the curve of Figure 4, where the transmission varies only at a slow rate with respect to frequency. Because of the periodic spatial electric field, and as explained above, we may now consider the important carrier frequency term $e_1'$ given by Equation 13 or 15. This term, $e_1'$, which has a phase $\phi_g$ highly or critically sensitive to frequency, is employed with the upper and lower side frequencies displaced from it by the frequency $p$. Considering only the two side frequencies and the critically phase sensitive carrier frequency, the voltage arriving at the detector may be written as follows:

$$e_D = -J_1(\phi)E'\cos\left[\left(\omega_o+\frac{\beta}{2}E_1^2\right)t+\phi_g\right]$$
$$+J_1\left(\frac{\Delta\omega}{\beta}\right)E_o\cos\left[\left(\omega_o+\frac{\beta}{2}E_1^2-p\right)\right] \quad (18)$$
$$-J_1\left(\frac{\Delta\omega}{\beta}\right)E_o\cos\left[\left(\omega_o+\frac{\beta}{2}E_1^2+p\right)\right]$$

where $\phi_g$ represents the highly critical frequency-dependent phase due to the anomalous dispersion of the very narrow, Doppler reduced, spectral line 34 of Figure 4. As pointed out above, the side frequencies are well outside the region of anomalous dispersion, for which reason the phase $\theta_g$ plays no part in the side frequency terms. Actually $p$ may be chosen to be a normal I. F. (intermediate frequency) in the range, for example, of ten to thirty mc. (megacycles per second). The output $e_c$ of the I.F. amplifier at frequency $p$ which follows the AM (amplitude modulation) detector 44 of Figure 5, may be deduced from the voltages which are applied to the detector as expressed in Equation 18, is as follows:

$$e_c = kJ_1(\phi)J_1\left(\frac{\Delta\omega}{p}\right)E'E_o\sin\phi_g\sin pt \quad (19)$$

where $k$ is some suitable factor. It is assumed, of course, that the AM detector and amplifier 44 removes terms of the carrier frequency, and preserves only terms at the so-called I. F. frequency $p$. It is apparent from Equation 19 that as long as the frequency of the microwave generator coincides with the center frequency of the narrow Doppler reduced spectral line 34 of Figure 4, $\phi_g$ is zero and $\sin\phi_g$ is also zero. If the frequency of the microwave oscillator shifts in one direction, the algebraic sign of $\sin\phi_g$ is positive; if the frequency of the microwave generator 40 shifts in the other direction, the algebraic sign of $\sin\phi_g$ is negative. The oscillations from the modulation oscillator 42 of frequency $p$ provide a reference for the voltage $e_c$ expressed in Equation 19 from the AM detector and amplifier 44. The reference voltage and the output $e_c$ from the AM detector are compared in a phase comparison detector 46, in which the frequency $p$ is filtered out. The output from the phase detector, corresponding to the relative phases of voltages from the AM detector and amplifier 44 and from the modulation oscillator 42 is applied as a D. C. (direct current) or slowly varying voltage to the frequency control element 41 of the microwave generator 40. The frequency control voltage thus applied to the frequency control element 41 has sensing, and is extremely sensitive with respect to changes in the generator frequency. The Q of the spectral line 34 may be extremely high, of the order $5\times10^6$ or greater, as compared with the Q of spectral lines which are not improved by reduction of Doppler effects, for example, a spectral or resonance line such as 36 without the superimposed pip 34, which may have a Q of only $2\times10^5$. The adjustable phase shifter 48 is inserted in order to give the appropriate phase comparison at the "on frequency" condition of the microwave generator 40. Attention may also be directed to the fact that the carrier frequency passing through the gas cell which is not phase shifted contributes nothing to the output of the phase comparison detector if the phase shifter 48 is appropriately adjusted.

A low pass filter at the output of the phase comparison detector 46 may be arranged in known manner to prevent the modulation frequency from the modulation oscillator 42 from being applied by way of the frequency control element 41 back to the phase comparison detector 46. Similarly, the modulation oscillator 42 may include suitable filters to prevent the slowly varying or D. C. frequency control voltage from affecting the modulation oscillator 42.

Those skilled in the art understand the proper and suitable filter means for preventing the output of the modulation oscillator from affecting the phase comparison detector at its output, and the output of the phase comparison detector from affecting the modulation oscillator 42 at its output.

A modification of the embodiment of Figure 5 is shown in Figure 6, in which the microwave generator 40 is not directly frequency modulated. In the embodiment of Figure 6, the microwave generator 40 frequency is fixed at the value $\omega_1$ indicated by Equation 3, for example. The modulation oscillator 42 of frequency $p$ is connected to a balanced modulator 50 to provide balanced modulation of the signal from generator 50 which is also applied to the balanced modulator 50. A signal at the carrier frequency is abstracted from the generator 40 and re-combined after passage through a suitable 90° or $\pi/2$ phase shifter 52 with the output of the balanced modulator at a junction 54 preferably substantially reflectionless. In other words, the output of the balanced modulator 50 includes substantially only the sidebands. The carrier is supplied from the microwave generator 40 through the phase shifter 52 in such phase or relation at junction 54 as corresponds to FM (frequency modulation) modulation. This signal at junction 54 which conforms to an FM signal, insofar as the frequency components of interest for the purposes of the invention are concerned, are applied to the gas cell 10 by means such as the waveguide 20 of Figure 1.

Thus, in operation, the arrangement of Figure 6 may be substituted for the generator 40 and modulation oscillator 42 of Figure 5. The phase comparison detector 46 output is applied to the generator 40. Filtering additional to that normally included in the phase detector may be omitted. Also, the output from the generator 40, with the modification of Figure 6, is a single unmodulated frequency which is not readily obtained without filtering in the arrangement of Figure 5.

Still another modification is shown in Figure 7. Here the effective signal power is quadrupled by reflecting both the signal and exciting fields after one passage through the cell by use of the reflecting plate 30. A second passage of the fields through the cell doubles the signal field and quadruples the signal power. The signal is extracted through the directional coupler 31 conventionally illustrated. The reflecting plate 33 should be positioned correctly to provide phase addition of the two signal components which result. The correct plate 33 position may be determined readily by trial. The plate or plunger 33 is placed in the waveguide 18 beyond the seal for easy access for this purpose.

Thus the invention discloses means for detecting a spectral line of reduced Doppler width. A frequency modulated or the like signal is applied to the gas cell, and amplitude modulation detection is employed to recover a signal of the modulation frequency subject to a phase critically sensitive to the frequency of the generator. This signal is compared in phase with the modulation frequency to recover a signal having a sense and amplitude corresponding to the departure of the carrier frequency from the Doppler reduced microwave spectral line, which may be used for spectral line indication or for frequency control.

What is claimed is:

1. A system comprising a microwave generator for generating a carrier frequency and a pair of sideband frequencies, of which one is above and one is below and each is displaced by a modulation frequency from said carrier frequency in frequency modulation relation therewith, a microwave absorption gas cell containing a gas at low pressure and containing means for providing two different gas resonance frequencies at spatially periodic intervals of half wavelength at the said carrier frequency, means for applying said carrier frequency to said cell, and means for amplitude modulation detecting said sideband frequencies signals against the said carrier frequency signal transmitted by said gas.

2. The system claimed in claim 1, further comprising a utilization circuit for the said detector output.

3. The system claimed in claim 1, further comprising a phase comparison detector connected for comparing the phase of output of said detecting means with said modulation frequency derived from said generator as a reference.

4. The system claimed in claim 1, said generator having a frequency control element and a modulation oscillator having its output applied to said element.

5. A system comprising a microwave generator, a microwave absorption cell containing a gas at low pressure and containing means for providing two different gas resonance frequencies at spatially periodic intervals of a half wavelength at said generator frequency, a modulation oscillator and a balanced modulator connected to receive carrier frequency energy from said generator and to receive modulation oscillations from said oscillator to provide balanced sideband frequencies without a carrier, and means comprising a signal path from said generator and excluding said modulator for supplying a carrier signal to the sideband frequencies in frequency modulation relationship, means for applying said carrier and modulation sideband frequencies to said cell, and means for amplitude modulation detecting said sideband frequency signals against the said carrier frequency signal transmitted by said gas.

6. A system comprising a microwave generator for generating a carrier frequency and a pair of sideband frequencies, of which one is above and one is below and each is displaced by a modulation frequency from said carrier frequency in frequency modulation relation therewith, said microwave generator including a frequency control element, a microwave absorption gas cell containing a gas at low pressure and containing means for providing two different gas resonance frequencies at spatially periodic intervals of half wavelength at the said carrier frequency, means for applying said carrier frequency to said cell, and means for detecting said sideband frequencies against the said carrier transmitted by said gas for amplitude modulation at the said modulation frequency, and a phase comparison detector for comparing the phase of the output of said detecting means against said modulation frequency derived from said generator means as a reference, the output of said phase comparison detector being connected in frequency controlling sense to said element.

7. The system claimed in claim 6, said generator having a frequency control element and a modulation oscillator having its output applied to said element.

8. The system claimed in claim 6, said generator comprising means for generating a carrier frequency signal, a modulation oscillator, a balanced modulator receiving said carrier frequency signal and modulation oscillations from said oscillator to provide balanced sideband frequencies without a carrier, and means comprising a signal path from said means for generating and excluding said modulator for supplying said carrier signal to the sideband frequencies in frequency modulation relationship.

9. The system claimed in claim 6, the means for providing said different gas resonance frequencies including planar grids spaced at half wavelength intervals at said frequency, the voltage between successive grids having one value for alternate adjacent pairs of grids, and a second value different from the first for the other alternate pairs of grids.

10. The system claimed in claim 6, further comprising a reflector of microwave energy positioned to reflect energy applied to said cell to be transmitted a second time through said cell.

References Cited in the file of this patent

UNITED STATES PATENTS

| | | |
|---|---|---|
| 2,560,365 | Norton | July 10, 1951 |
| 2,584,608 | Norton | Feb. 5, 1952 |
| 2,591,257 | Hershberger | Apr. 1, 1952 |
| 2,602,835 | Hershberger | July 8, 1952 |